Nov. 25, 1930.   J. AMLER   1,783,066
AUTOMOBILE TRAP BUMPER
Filed May 2, 1930   2 Sheets-Sheet 1

J. Amler  INVENTOR
BY Victor J. Evans
ATTORNEY

Nov. 25, 1930.  J. AMLER  1,783,066
AUTOMOBILE TRAP BUMPER
Filed May 2, 1930   2 Sheets-Sheet 2
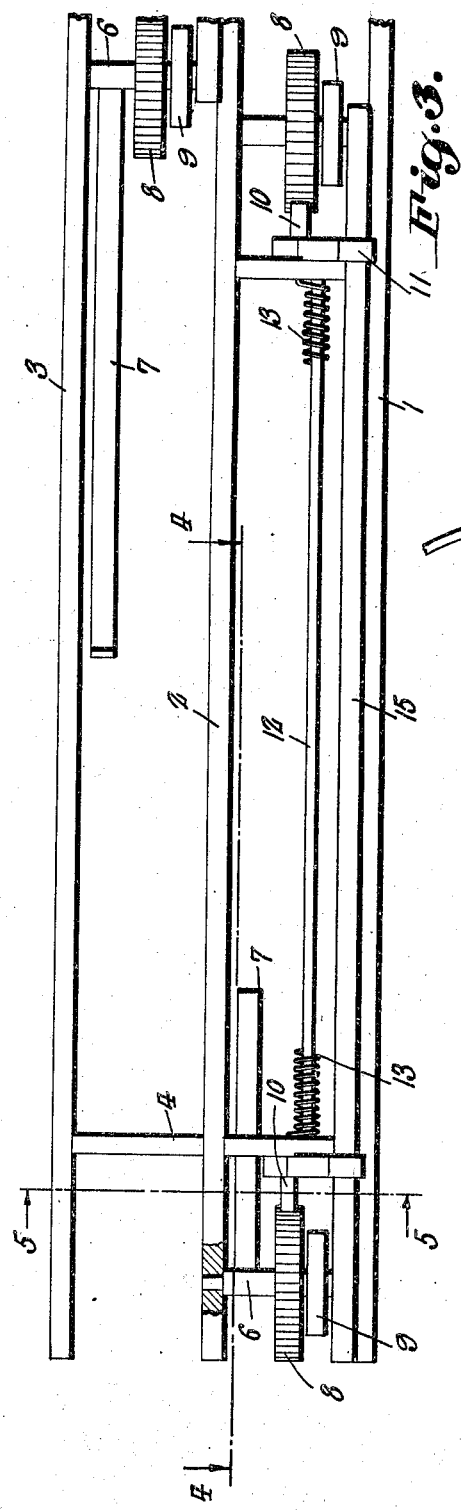
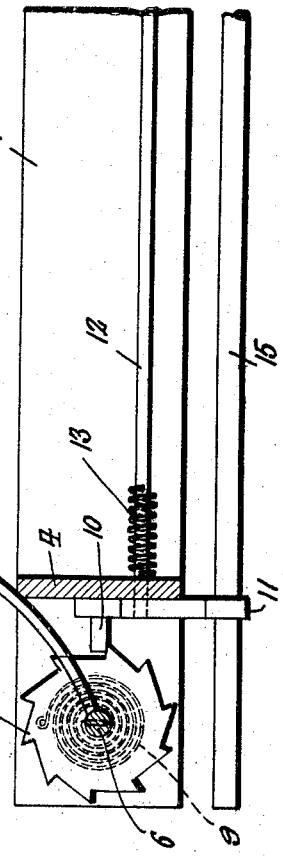
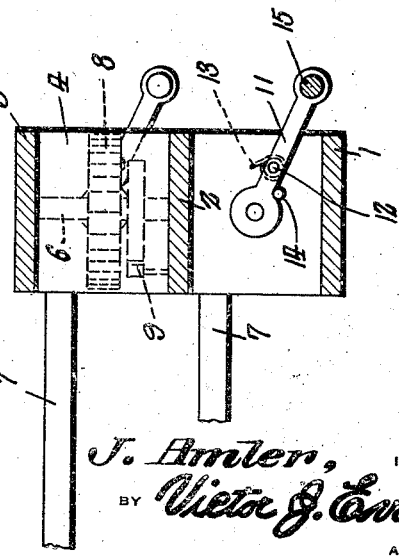
J. Amler, INVENTOR
BY Victor J. Evans
ATTORNEY Patented Nov. 25, 1930

1,783,066

UNITED STATES PATENT OFFICE

JAROSLAV AMLER, OF STAMFORD, CONNECTICUT

AUTOMOBILE TRAP BUMPER

Application filed May 2, 1930. Serial No. 449,256.

My present invention has reference to a life saving device for automobiles or like vehicles and is in the nature of a bumper, the object being the provision, in a structure for this purpose, means operated by the force of contact against the bumper rods for gripping and supporting the person contacted by the bumper to prevent his falling beneath the wheels or beneath the body of the car, and consequently obviate the liability of serious injury to such person, the device being also operable to grip and lock a vehicle which contacts with the bumper rods, and thereby trap or in other words prevent the escape of "hit and run" drivers.

A further object is the provision of a device for this purpose which may be readily attached to the front of any ordinary vehicle, which is simple in constructon, automatic and positive in operation.

The invention will be fully and comprehensively understood from a consideration of the following detailed description when read in connection with the accompanying drawings which form part of the application, with the understanding, however, that the improvement is capable of extended application and is not confined to the exact showing of the drawings nor the precise construction described and, therefore, such changes and modifications may be made therefrom as do not affect the spirit of the invention nor exceed the scope thereof as expressed in the appended claims.

In the drawings:

Figure 3 is an enlarged detail front elevation with parts in section.

Figure 4 is a sectional view approximately on the line 4—4 of Figure 3.

Figure 5 is a sectional view approximately on the line 5—5 of Figure 3.

Figures 1, 2:
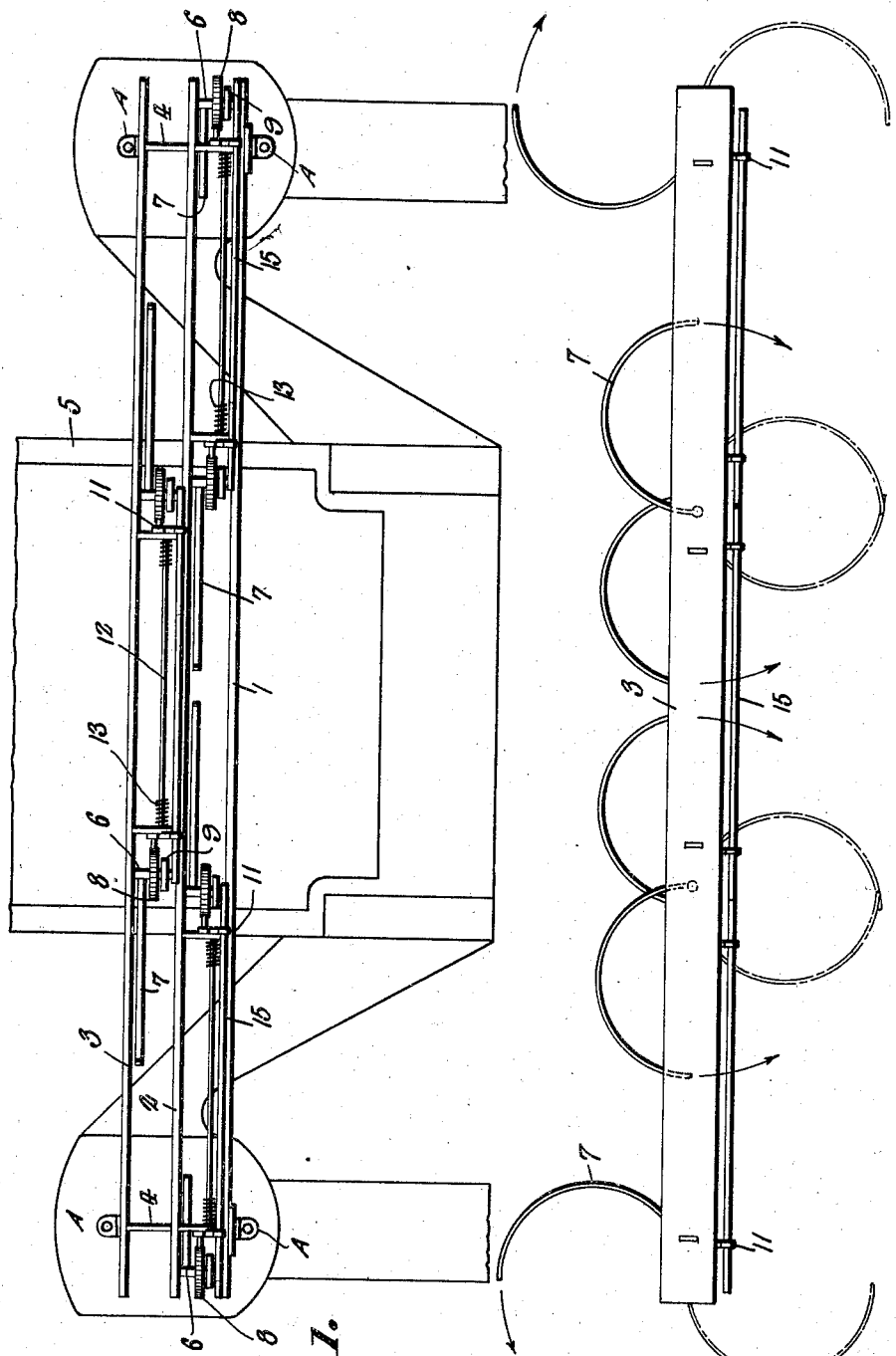
Figure 1 is a front elevation of a sufficient portion of an automobile or like motor propelled vehicle to illustrate the application of my improvement thereon.
Figure 2 is a top plan view of the improvement detached, the dotted lines indicating the swinging of the arched gripping arms.

If desired the improvement may be supported from the front ends of the front mud guards of the vehicle by angle brackets A, as disclosed by Figure 1 of the drawings. It is to be understood that the device may be applied to the rear as well as to the front of the vehicle.

As disclosed by the drawings, the improvement contemplates the employment of a metal frame, which in the construction disclosed by the drawings comprises three plates which are of an equal length, width and thickness. For distinction the lower plate is indicated by the numeral 1, the intermediate plate by the numeral 2 and the top plate by the numeral 3. These plates, at desired points throughout, are connected and held in spaced relation by short vertical plates 4 and the frame thus provided may, as heretofore stated, be secured to the mud guards of an automobile 5 in any desired or preferred maner or the said frame may be secured to the bumper of the machine or otherwise secured to the front of the machine at a desired elevation to grip and support objects that contact therewith.

Adjacent to the ends, and at suitable points from the center there are journaled between the upper, lower and central plates of the frame short shafts 6, respectively. By reference to the drawings it will be seen that two of the lower shafts 6 are journaled between the plates 1 and 2 between the ends of the frame and that the remaining short shafts are journaled respectively between the plates 1 and 2 and the plates 2 and 3 at points equidistant from the center of the frame. Each of the short shafts has fixedly secured thereon an arched or semi-circular rod 7. These rods are of heavy and strong material but preferably the same are covered by compressible casings so that the said rods, when brought to engagement with a human being will not inflict injury to such person.

On each of the short shafts there is fixed a ratchet wheel 8, and each of the short shafts is influenced in turn in one direction through the medium of spiral springs 9. These springs, when actuated to turn the short shafts will cause the arched rods or arms 7 to swing in the direction of the arrows, as disclosed by Figure 2 of the drawings, the said arched rods being normally retained in the full line position disclosed by Figure 2.

The respective sprocket wheels have their teeth engaged by a dog or detent 10 carried by a link 11. Fixedly connected to each of the adjacent pairs of links 11 and finding bearings in the uprights 4 of the frame there are shafts 12. These shafts are influenced by springs 13 to cant the links 11 downwardly to bring the said links against contact pins 14 carried by the uprights 4. The links extend a suitable distance outwardly with respect to the frame and the respective, and what may be termed the cooperating, pairs of links 11 are connected together by bars 15. The bars 15 are rigid but yieldable bodily and are in the nature of bumper or contact elements. It will be apparent that when any of the bars are forcibly contacted the links 11 connected thereto will be swung so that the dogs or detents 10 will be brought out of engagement with the teeth of the ratchet wheels 8, thereby releasing the spring influenced shafts connected with the said ratchet wheels so that the same will turn and swing the arched or curved gripping rods or arms 7 to the dotted line position disclosed by Figure 2 of the drawings and whereby the person or object contacting with the bars 15 will be gripped by the said arched members 7. When a person is engaged by the rods he will be held from falling below the frame and consequently will be prevented from contacting with the ground surface or falling into the path of contact of the wheels of the automobile 5. Should an object, such as an automobile or the like contacting with the bumper bars on the vehicle 5 be engaged by the arched or curved arms 7, the same will be locked to the said vehicle 5 with the result that such vehicle cannot escape until the members 7 are swung to released position. Thus it will be noted that the device serves as a trap which will prevent the escape of "hit and run" drivers as well as a life saving device for persons who are contacted by the bumper bars.

With the improvement it will be apparent that an automobile or like vehicle contacted with one provided with my device the same will not only be held from escaping but the occupants thereof will necessarily render such assistance to persons in the bumper equipped car as will alleviate any injuries to which they have been subjected and to likewise summons aid to such injured persons.

It may be stated that the most frequent fatal injuries do not result in the person being hit by the automobile but the impact of the force of the collision throws the person to the ground and frequently results in skull fracture, broken bones, etc. With an automobile equipped with my inprovement the person driving the same will be forced to give aid, as otherwise a person contacted will be dragged with the automobile which, of course, will attract attention so it will be noted that an automobile equipped with the improvement not only traps a vehicle that contacts with his machine but cannot escape with a person or obstacle trapped by the improvement without detection.

Having described the invention, I claim:

1. A device for the purpose set forth, comprising a frame fixedly secured on the front or rear of the vehicle, vertically disposed spring influenced shafts journaled on the frame, an arched gripping rod on each shaft, bumper bars projecting from the frame, pivoted links on the bumper bars, spring influenced shafts for the links, means carried by the links and means on the vertical spring influenced shafts cooperating with such means for holding the vertical spring influenced shafts from turning and for normally retaining the arched arms thereon rearwardly with respect to the frame.

2. In a device for the purpose set forth, a frame to be attached to the front of a motor or like vehicle and to extend over the front mud guards thereof, vertically disposed spring influenced shafts journaled in the frame, ratchet wheels on the shafts, arched gripping elements fixed on the shafts, links having detents to engage with the ratchet wheels, a spring influenced shaft supporting the respective pairs of links, said links projecting outwardly from the frame and a bumper bar connecting the respective pairs of links.

3. In a device for the purpose set forth, pivotally supported spring influenced arched gripping members, latching means for holding the members in non-gripping position, swingable bumper bars connected with the latching members and designed, when contacted to release such latching means to permit of the gripping members swinging to gripping position.

In testimony whereof I affix my signature.

JAROSLAV AMLER.